J. R. VAN TASSEL.
OPHTHALMIC MOUNTING.
APPLICATION FILED JUNE 24, 1918.
1,350,430.
Patented Aug. 24, 1920.
2 SHEETS—SHEET 1.
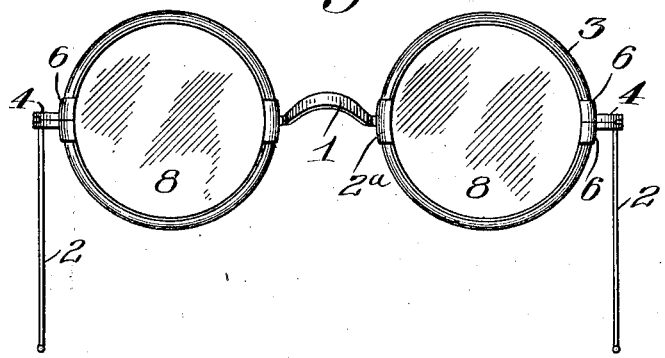
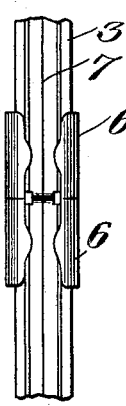
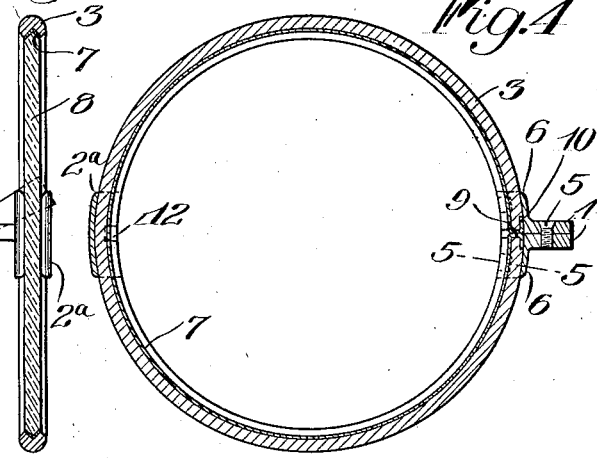
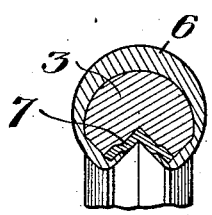
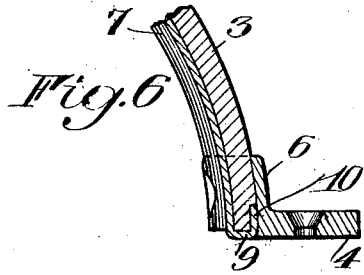
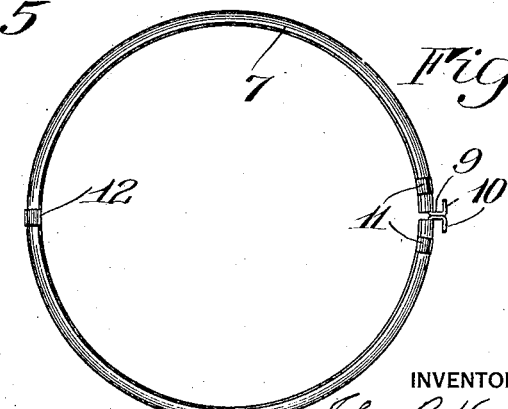
INVENTOR
John R. Van Tassel
BY
Davis & Simms
his ATTORNEYS

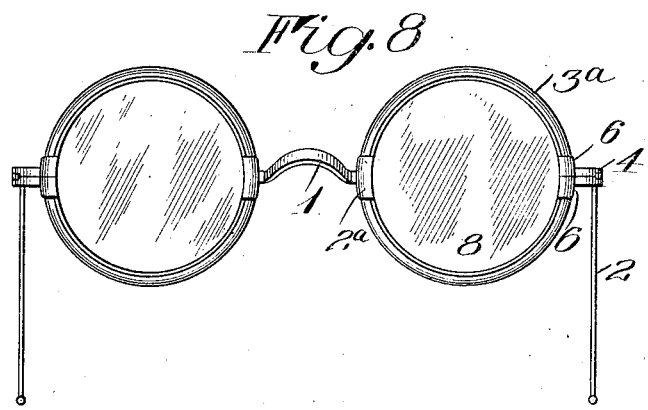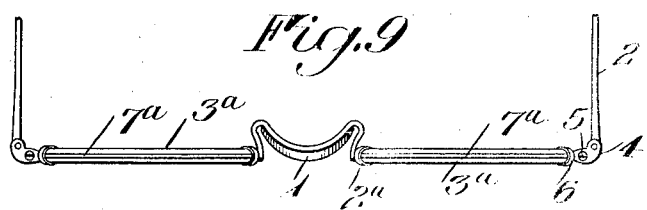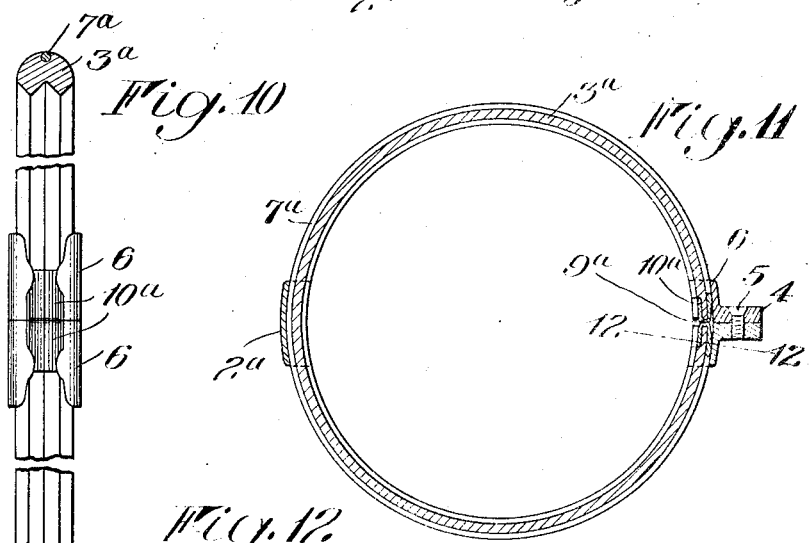

UNITED STATES PATENT OFFICE.

JOHN R. VAN TASSEL, OF GENEVA, NEW YORK, ASSIGNOR TO STANDARD OPTICAL COMPANY, OF GENEVA, NEW YORK, A CORPORATION.

OPHTHALMIC MOUNTING.

1,350,430.   Specification of Letters Patent.   Patented Aug. 24, 1920.

Application filed June 24, 1918. Serial No. 241,489.

*To all whom it may concern:*

Be it known that I, JOHN R. VAN TASSEL, a citizen of the United States, and resident of Geneva, in the county of Ontario and State of New York, have invented certain new and useful Improvements in Ophthalmic Mountings, of which the following is a specification.

The present invention relates to ophthalmic mountings and more particularly to the type in which the lens frames are formed from rings of nonmetallic material, such as celluloid, xylonite or the like, an object of this invention being to combine, with the nonmetallic rings, metallic rings adapted to be associated with the nonmetallic rings to be held firmly to such rings without the provision of separate fastening devices. Another object of the invention is to provide reinforcement rings for nonmetallic lens frames adapted to be inserted in the ordinary lens grooves of the nonmetallic rings and to be held in place by the clips on the temple attaching ears and the bridge.

To these and other ends, the invention consists of certain parts and combinations of parts, all of which will be hereinafter described, the novel features being pointed out in the appended claims.

In the drawings:—

Figure 1 is a front view of an eyeglass mounting embodying the present invention;

Fig. 2 is an enlarged detail view of the inner face of one of the lens frames adjacent the split;

Fig. 3 is an enlarged transverse, vertical section through one of the lens frames showing the lens in position thereon;

Fig. 4 is an enlarged vertical section in the plane of the lens;

Fig. 5 is a section on the line 5—5, Fig. 4;

Fig. 6 is a detail sectional view of a portion of a lens frame adjacent the split;

Fig. 7 is a front view of one of the metallic reinforcing rings removed from the nonmetallic ring;

Fig. 8 is a front view of still another embodiment of the invention;

Fig. 9 is a top view of the embodiment shown in Fig. 8;

Fig. 10 is an enlarged, transverse, vertical section of the same embodiment, the lens being removed;

Fig. 11 is a vertical section of the same embodiment in the plane of one of the lenses;

Fig. 12 is a section on the line 12—12, Fig. 11; and

Fig. 13 is a detail view of the embodiment shown in Figs. 8–12 adjacent to the split in the lens frame.

Ophthalmic mountings made from celluloid, xylonite and the like now in general use usually have the bridge and the temples secured to the mounting by clips. In some instances the nonmetallic frames or rings have been reinforced by metallic rings, but in all cases of which I am aware the bridges or the temple attaching ears have been permanently secured to the reinforcing rings, or the parts have been constructed so that it is impossible to employ the usual clips on the temple attaching ears and on the bridge for uniting the metallic to the nonmetallic rings. According to this invention, metallic rings are so formed and associated with the nonmetallic rings that the usual clips on the temple attaching ears and on the bridge may be utilized for securing the metallic rings to the nonmetallic rings. In this way the metallic rings may be constructed as separate articles of manufacture to be sold to dealers for association with mountings made from nonmetallic rings alone.

Referring first to the embodiment of the invention shown in Figs. 1–7, 1 indicates the bridge, 2 the temples and 3 the nonmetallic rings, the bridge having at its opposite ends two clips 2$^a$ which are bent about the nonmetallic rings, and each temple being secured between two ears 4 held together by a screw 5 and each ear having a clip 6 bent about the nonmetallic ring 3. This type of mounting is old and in commercial use.

A feature of the present invention is a metallic ring 7 for each nonmetallic ring illustrated in one form in Fig. 7, where it is made from sheet metal bent into V-shape in cross-section so as to fit in the groove on the inner face of the nonmetallic ring and to provide in turn a groove for the reception of the lens 8. This metallic ring 7 is, like the nonmetallic ring 3, split and at the ends of the split is provided with extensions bent at 9 to coöperate with the ends of the split in the associated nonmetallic ring 3, said ring also having, beyond the extensions 9, extensions 10 which project over the outer face of the nonmetallic ring under the clips 6 so as to be held between the clips and the nonmetallic ring 3, as shown in Figs. 4 and 6, whereby the clips 6 may be utilized for firmly securing the metallic ring to the nonmetallic ring 3. To still further maintain engagement between the clips 6 and the metallic ring 7, the metallic ring 7 is provided, adjacent its split, with two pairs of oppositely and laterally extending projections 11 which are engaged by the clips 6. The clips 2ª, also serve for holding the metallic ring 7 to the nonmetallic ring 3, and to this end the metallic ring 7 has between its ends, and substantially opposite the split, two oppositely-extending projections 12 which are engaged by the clips 2ª.

In the embodiment shown in Figs. 8–13, the metallic ring 7ª surrounds the nonmetallic ring 3ª, and to this end the latter is provided with a groove in which the metallic ring 7ª is fitted. At the split, the metallic ring is provided with inwardly-turned extensions 9ª engaging the ends of the nonmetallic ring, and beyond said inwardly-turned portions are extensions 10ª for engaging with the inner face of the nonmetallic ring. The clips 6 in this instance surround both the metallic and the nonmetallic rings, and are bent inwardly into engagement with the extensions 10ª. The clips 2 on the bridge 1 each engage about the metallic and nonmetallic ring.

From the foregoing it will be seen that in both embodiments, each lens frame has a split nonmetallic ring and a split metallic ring, one of which surrounds the other, said rings being held together by two clips for securing a temple between them, each clip being separate from both rings but surrounding the outer ring and engaging the inner ring to hold the two rings together. Each metallic ring also has, adjacent the split, extensions which project around the ends of the nonmetallic ring and then on the opposite side of the nonmetallic ring, so that the temple attaching clips engage the metallic ring on both sides of the nonmetallic ring. The construction shown in Figs. 1–7 may be combined with the ordinary commercial nonmetallic frame with clips of the type described, without any modification of the frame other than the introduction of the metallic ring. The connection between the metallic ring and the nonmetallic ring is rigid, as the metallic ring has extensions which pass about the ends of the nonmetallic frame so that the clips will engage the metallic ring on both sides of the nonmetallic ring.

What I claim as my invention and desire to secure by Letters Patent is:—

1. An ophthalmic mounting comprising a split nonmetallic ring and a split metallic ring, one of which surrounds the other, and two clips for securing a temple between them, each clip being separate from both rings but surrounding the outer ring and engaging the inner ring to hold the rings together, the metallic ring having lateral extensions at its split lying in the split of the nonmetallic ring and engaging the split ends of such nonmetallic ring.

2. An ophthalmic mounting comprising a split nonmetallic ring and a split metallic ring, one of which surrounds the other, and two clips for securing a temple between them, each clip being separate from both rings but surrounding the outer ring and engaging the inner ring to hold the rings together, the metallic ring having lateral extensions at its split lying in the split of the nonmetallic ring and engaging the split ends of such nonmetallic ring and being further extended on the opposite side of the nonmetallic ring between the latter and the adjacent clips.

3. An ophthalmic mounting comprising a split nonmetallic ring and a split metallic ring surrounded by the nonmetallic ring and formed with a groove to receive a lens, and two clips for securing a temple between them, each clip being separate from both rings, surrounding the outer ring and engaging the inner ring to hold the two rings together, the inner metallic ring having adjacent its split two pairs of lateral extensions engaged by the clip.

4. An ophthalmic mounting comprising a split nonmetallic ring and a split metallic ring surrounded by the nonmetallic ring and formed with a groove to receive a lens, and two clips for securing a temple between them, each clip being separate from both rings, surrounding the outer ring and engaging the inner ring to hold the two rings together, the inner metallic ring having extensions at its split projecting into the split of the nonmetallic ring and on the outer side of the metallic ring between said ring and the adjacent clips.

5. An ophthalmic mounting comprising a split nonmetallic outer ring and a split metallic inner ring formed with a groove to receive a lens, said inner ring having oppositely extending lateral projections between its split ends, a bridge, and a clip carried by the bridge surrounding the nonmetallic ring and engaging the oppositely-extending lateral projections.

6. In a rim for eyeglass and spectacle frames, the combination with a strip of celluloid or similar flexible material, of a metal lining-strip embedded in the side of the celluloid strip and bent back across the ends thereof, and metal end-pieces engaging the bent over ends of the lining-strip and arranged to be clamped together to bind the rim against the edge of the lens.

JOHN R. VAN TASSEL.